(12) United States Patent
Yim

(10) Patent No.: US 7,633,517 B2
(45) Date of Patent: Dec. 15, 2009

(54) PROVIDING SATELLITE IMAGES OF VIDEOCONFERENCE PARTICIPANT LOCATIONS

(75) Inventor: Wai Yim, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 843 days.

(21) Appl. No.: 11/253,419

(22) Filed: Oct. 19, 2005

(65) Prior Publication Data

US 2007/0115347 A1     May 24, 2007

(51) Int. Cl.
*H04N 7/14*     (2006.01)
*H04Q 11/00*    (2006.01)

(52) U.S. Cl. ............... 348/14.08; 348/14.09; 348/14.01
(58) Field of Classification Search ... 348/14.01–14.16; 370/260, 261; 709/204, 205
See application file for complete search history.

(56) References Cited

U.S. PATENT DOCUMENTS 5,844,560 A * 12/1998 Crutcher et al. ............. 715/840
6,771,969 B1    8/2004 Chinoy et al.
2003/0232648 A1* 12/2003 Prindle ........................ 463/40
2005/0021620 A1*  1/2005 Simon et al. ................ 709/204
2007/0041540 A1*  2/2007 Shao et al. ............. 379/142.01

FOREIGN PATENT DOCUMENTS

| JP | 09-214923 | 8/1997 |
| JP | 2001-217959 | 8/2001 |
| JP | 2002-032773 | 1/2002 |
| JP | 2003-204297 | 7/2003 |
| JP | 2005061966 | 3/2005 |
| JP | 2005061966 A * | 3/2005 |
| WO | WO 2005/025250 A1 | 3/2005 |

* cited by examiner

*Primary Examiner*—Melur Ramakrishnaiah

(57) ABSTRACT

A videoconferencing method having corresponding apparatus and computer programs comprises receiving exchanging audiovisual data for a videoconference with a videoconference server; identifying a physical location of a videoconference client; and either sending an indicator of the location to the server, which obtains physical location video data for the location comprising satellite photographs of the location and sends the data to other videoconference clients, or obtaining the data and sending the data to the server, which sends the data to other videoconference clients in the videoconference.

18 Claims, 4 Drawing Sheets

PROVIDING SATELLITE IMAGES OF VIDEOCONFERENCE PARTICIPANT LOCATIONS

BACKGROUND

The present invention relates generally to videoconferencing. More particularly, the present invention relates to providing satellite images of videoconference participant locations.

SUMMARY

In general, in one aspect, the invention features a videoconferencing method for a videoconference client, the method comprising: receiving first audiovisual data for a videoconference from a videoconference server; sending second audiovisual data for the videoconference to the videoconference server; identifying a physical location of the videoconference client; and performing at least one of sending an indicator of the physical location to the videoconference server, wherein the videoconference server obtains physical location video data for the physical location, the physical location video data comprising a plurality of satellite photographs of the physical location, and wherein the videoconference server sends the physical location video data to one or more others of the videoconference clients in the videoconference, or obtaining the physical location video data for the physical location, and sending the physical location video data to the videoconference server, wherein the videoconference server sends the physical location video data to the one or more others of the videoconference clients in the videoconference.

In some embodiments, the physical location video data represents a moving picture of the respective physical location shown at increasing magnification. In some embodiments, the physical location video data further comprises a plurality of graphic images of the respective physical location. Some embodiments comprise an apparatus to perform the method. Some embodiments comprise a computer program for performing the method.

In general, in one aspect, the invention features a videoconferencing method for a videoconference client, the method comprising: receiving first audiovisual data for a videoconference; sending second audiovisual data for the videoconference; and performing at least one of receiving an indicator of a physical location of one or more others of the videoconference clients in the videoconference, obtaining physical location video data for each of the physical locations, the physical location video data comprising a plurality of satellite photographs of the respective physical location, and displaying the physical location video data, or receiving the physical location video data for the physical locations of the one or more others of the videoconference clients in the videoconference, and displaying the physical location video data.

In some embodiments, the physical location video data represents a moving picture of the respective physical location shown at increasing magnification. In some embodiments, the physical location video data further comprises a plurality of graphic images of the respective physical location. Some embodiments comprise displaying the physical location video data for the one or more others of the videoconference clients automatically when the one or more others of the videoconference clients join the videoconference. Some embodiments comprise an apparatus to perform the method. Some embodiments comprise a computer program for performing the method.

In general, in one aspect, the invention features a videoconferencing method comprising: receiving audiovisual data from each of a plurality of videoconference clients; sending the audiovisual data received from each of the videoconference clients to others of the videoconference clients; identifying a physical location of at least one of the videoconference clients; obtaining physical location video data for each of the physical locations, the physical location video data comprising a plurality of satellite photographs of the respective physical location; and sending the physical location video data to one or more of the videoconference clients.

In some embodiments, the physical location video data represents a moving picture of the respective physical location shown at increasing magnification. In some embodiments, the physical location video data further comprises a plurality of graphic images of the respective physical location. Some embodiments comprise receiving an indicator of each physical location from respective ones of the videoconference clients. Some embodiments comprise sending the physical location video data for physical location of one of the videoconference clients automatically when the one of the videoconference clients joins the videoconference. Some embodiments comprise an apparatus to perform the method. Some embodiments comprise a computer program for performing the method.

The details of one or more implementations are set forth in the accompanying drawings and the description below. Other features will be apparent from the description and drawings, and from the claims.

Figure 1:
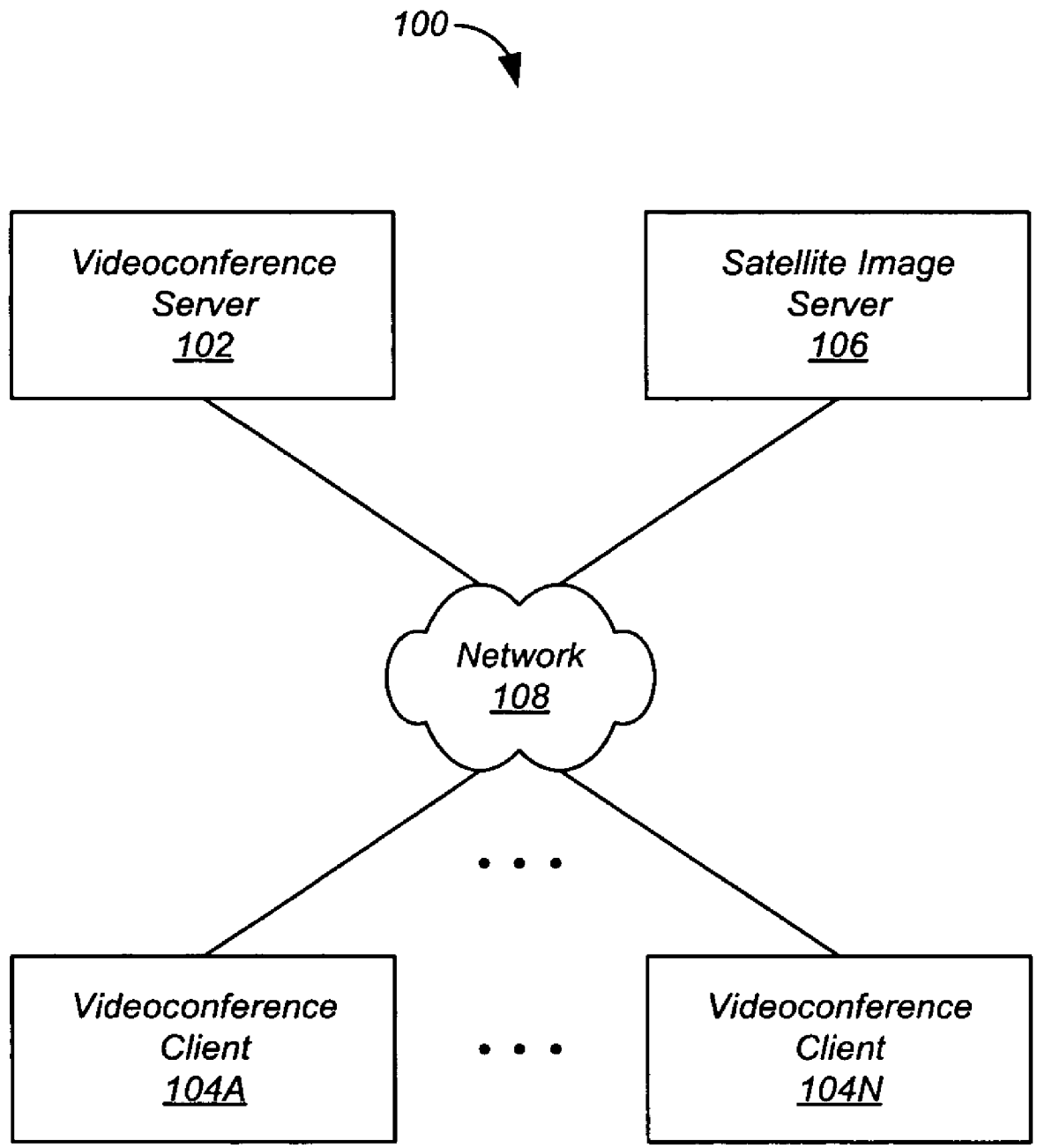
FIG. 1 shows a videoconference system comprising a videoconference server and a plurality of videoconference clients engaged in a videoconference.

The leading digit(s) of each reference numeral used in this specification indicates the number of the drawing in which the reference numeral first appears.

DETAILED DESCRIPTION

Embodiments of the present invention provide videoconferencing systems, videoconference clients, and videoconference servers that provide satellite images of videoconference client physical locations to the videoconference clients. The satellite photographic images for a physical location are preferably provided in the form of physical location video data representing a moving picture of the physical location shown at increasing magnification, and can be combined with graphical images, text, and the like to provide further information. The videoconference system preferably obtains the images, text, and the like from a satellite image provider. While embodiments of the present invention are described in terms of a client-server paradigm, other embodiments operate according to other paradigms such as peer-to-peer paradigms and the like.

FIG. 1 shows a videoconference system 100 comprising a videoconference server 102 and a plurality of videoconference clients 104A-N engaged in a videoconference. Also shown is a satellite image server 106. Preferably videoconference server 102, videoconference clients 104, and satellite image server 106 are connected by one or more networks 108 such as the Internet.

Figure 2:
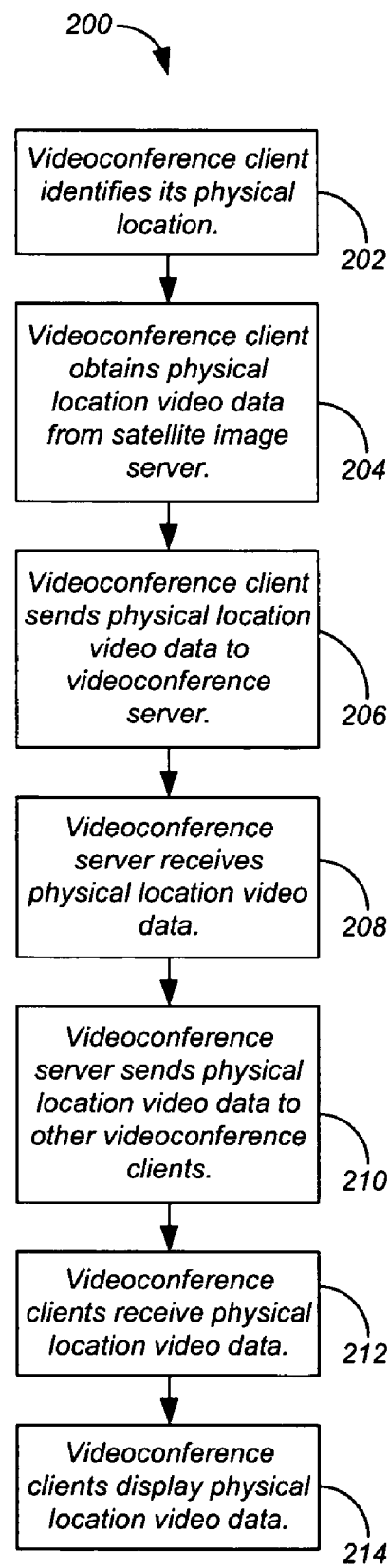
FIG. 2 shows a process for the videoconference system of FIG. 1 according to a preferred embodiment of the present invention where videoconference clients obtain the physical location video data of their physical locations.

FIG. 2 shows a process 200 for videoconference system 100 according to a preferred embodiment of the present invention where videoconference clients 104 obtain the physical location video data of their physical locations. During the course of a videoconference, videoconference server 102 and videoconference clients 104 send and receive audiovisual data according to well-known techniques.

Each videoconference client 104 identifies a physical location, such as a street address, latitude and longitude, or the like, associated with the videoconference client 104 (step 202). For example, each videoconference client 104 prompts a user to enter the address, obtains the address automatically from a Lightweight Directory Access Protocol (LDAP) directory, or the like.

Each videoconference client then automatically obtains physical location video data for the physical location from satellite image server 106 (step 204). The physical location video data preferably comprises a plurality of satellite photographs of the physical location. The physical location video data preferably represents a moving picture of the respective physical location shown at increasing magnification.

The physical location video data optionally further comprises graphic images of the respective physical location. For example, the video can begin with views of the Earth from outer space, followed by a series of maps, followed by the satellite photographs, all shown at a steady rate of increasing magnification to convey an effect of approaching the physical location from above.

Satellite image server 106 can be part of videoconference server 102, and can even reside on the same physical device, but is preferably operated by a satellite image provider that provides an application programming interface (API) for videoconference server 102.

Videoconference clients 104 preferably obtain the physical location video data before the first videoconference, and store the physical location video data for use in each videoconference, as described in detail below. Alternatively, videoconference clients 104 obtain the physical location video data at the beginning of each videoconference.

Each videoconference client 104 sends the physical location video data to videoconference server 102 (step 206), which receives the physical location video data (step 208) and then sends the physical location video data to one or more others of videoconference clients 104 (step 210). Preferably each videoconference client 104 compresses the physical location video data prior to transmission, and decompresses the video data on reception, according to conventional techniques. In some embodiments, videoconference server 102 stores the physical location video data, either compressed or not, for use in future videoconferences.

Videoconference clients 104 receive the physical location video data (step 212) and decompress the physical location video data, if necessary. Videoconference clients 104 then display the physical location video data (step 214). Preferably the physical location video data of the physical location of a videoconference client 104 is displayed automatically as that videoconference client 104 joins the current videoconference. In addition, a user can view the physical location video data at any time by manipulating a graphical user interface. Users can view the physical location video data for any videoconference client 104, including the user's videoconference client 104.

Preferably the physical location video data simply replaces the video portion of the regular videoconference audiovisual data, which continues to be received uninterrupted, but is not displayed. In other embodiments, the physical location video data is shown in a separate window concurrently with the video portion of the regular videoconference audiovisual data.

Figure 3:
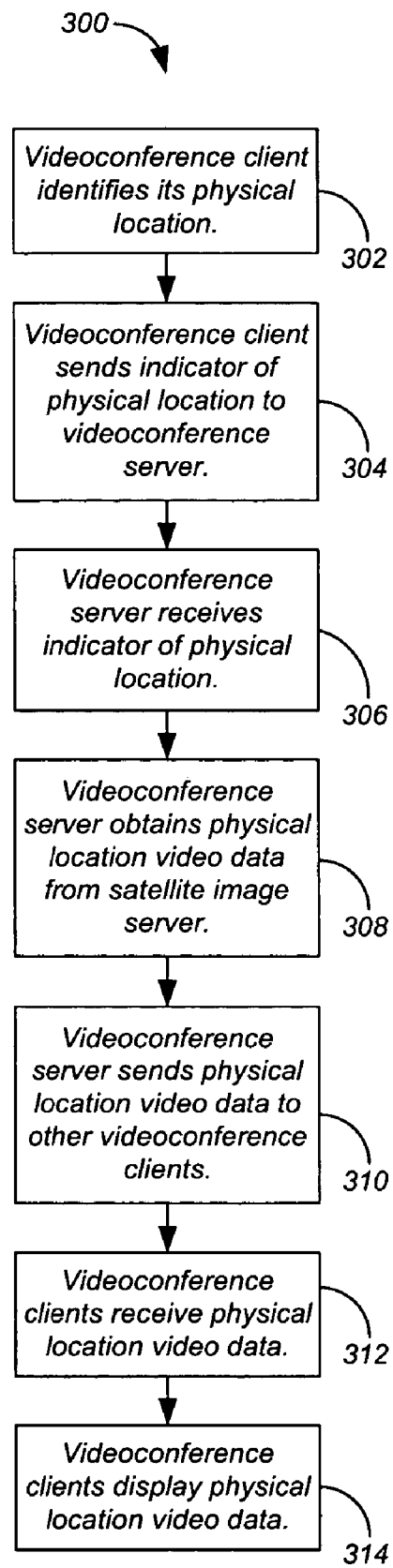
FIG. 3 shows a process for the videoconference system of FIG. 1 according to a preferred embodiment of the present invention where videoconference server obtains the physical location video data of the physical locations of videoconference clients.

FIG. 3 shows a process 300 for videoconference system 100 according to a preferred embodiment of the present invention where videoconference server 102 obtains the physical location video data of the physical locations of videoconference clients 104. During the course of a videoconference, videoconference server 102 and videoconference clients 104 send and receive audiovisual data according to well-known techniques.

Each videoconference client 104 identifies a physical location, such as a street address, latitude and longitude, or the like, associated with the videoconference client 104 (step 302). For example, each videoconference client 104 prompts a user to enter the address, or obtains the address automatically from a Lightweight Directory Access Protocol (LDAP) directory or the like.

Each videoconference client 104 then automatically sends an indicator of the physical location to videoconference server 102 (step 304). The indicator can be the street address or some other indicator of the physical location.

Videoconference server 102 receives the indicator of the physical location of videoconference client 104 (step 306) and obtains physical location video data for the physical location (step 308), as described above with reference to FIG. 2.

Videoconference server 102 sends the physical location video data to other videoconference clients 104 in the videoconference (step 310). Preferably videoconference server 102 compresses the physical location video data prior to transmission, and videoconference clients 104 decompress the video data on reception, according to conventional techniques. In some embodiments, videoconference server 102 stores the physical location video data, either compressed or not, for use in future videoconferences.

Videoconference clients 104 receive the physical location video data (step 312) and decompress the physical location video data, if necessary. Videoconference clients 104 then display the physical location video data (step 314), as described above.

Figure 4:
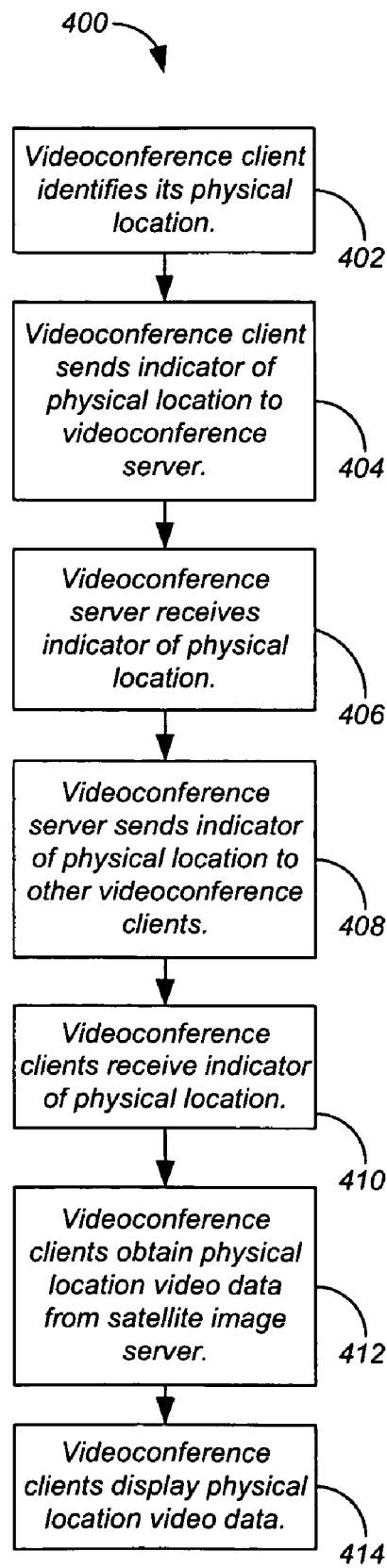
FIG. 4 shows a process for the videoconference system of FIG. 1 according to a preferred embodiment of the present invention where each videoconference client in a videoconference obtains the physical location video data of the physical locations of the other videoconference clients in the videoconference.

FIG. 4 shows a process 400 for videoconference system 100 according to a preferred embodiment of the present invention where each videoconference client 104 in a videoconference obtains the physical location video data of the physical locations of the other videoconference clients 104 in the videoconference. During the course of a videoconference, videoconference server 102 and videoconference clients 104 send and receive audiovisual data according to well-known techniques.

Each videoconference client 104 identifies a physical location, such as a street address, latitude and longitude, or the like, associated with the videoconference client 104 (step 402). For example, each videoconference client 104 prompts a user to enter the address, or obtains the address automatically from a Lightweight Directory Access Protocol (LDAP) directory or the like.

Each videoconference client 104 then automatically sends an indicator of the physical location to videoconference server 102 (step 404). The indicator can be the street address or some other indicator of the physical location.

Videoconference server 102 receives the indicators of the physical locations of videoconference clients 104 (step 406) and sends the indicators of the physical location of each videoconference client 104 in a videoconference to the other videoconference clients 104 in the videoconference (step 408).

Each videoconference client 104 in a videoconference receives the indicators of the physical locations of the other videoconference clients 104 in the videoconference (step 410), and obtains the corresponding physical location video data (step 412), as described above with reference to FIG. 2. Videoconference clients 104 then display the physical location video data (step 414), as described above.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors.

Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks.

Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A videoconferencing method for a videoconference client, the method comprising:
    receiving first audiovisual data for a videoconference from a videoconference server;
    sending second audiovisual data for the videoconference to the videoconference server;
    identifying a physical location of the videoconference client; and
    performing at least one of
        automatically sending an indicator of the physical location to the videoconference server, wherein the videoconference server obtains physical location video data for the physical location, wherein the videoconference server sends the physical location video data to one or more others of the videoconference clients in the videoconference and presents the physical location video data to the one or more others of the videoconference clients as a series of images shown at increasing magnification, or
        automatically obtaining the physical location video data for the physical location, and sending the physical location video data to the videoconference server, wherein the videoconference server sends the physical location video data to the one or more others of the videoconference clients in the videoconference and presents the physical location video data to the one or more others of the videoconference clients as a series of images shown at increasing magnification.

2. The method of claim 1, wherein the physical location video data further comprises a plurality of graphic images of the respective physical location.

3. An apparatus to perform the method of claim 1.

4. A computer-readable storage medium containing a computer program for performing the method of claim 1.

5. The method of claim 1, wherein the presentation of the physical location video data to the one or more others of the videoconference clients as a series of images shown at increasing magnification comprises presenting a view of the Earth, followed by a series of maps, followed by satellite photographs at a steady rate of increasing magnification.

6. A videoconferencing method for a videoconference client, the method comprising:
    receiving first audiovisual data for a videoconference;
    sending second audiovisual data for the videoconference; and
    performing at least one of
        receiving an indicator of a physical location of one or more others of the videoconference clients in the videoconference, obtaining physical location video data for each of the physical locations of the one or more others of the videoconference clients, and displaying the physical location video data of each of the one or more others of the videoconference clients as a series of images shown at increasing magnification, or
        receiving the physical location video data for the physical locations of the one or more others of the videoconference clients in the videoconference, and displaying the physical location video data of each of the one or more others of the videoconference clients as a series of images shown at increasing magnification.

7. The method of claim 6, wherein the physical location video data further comprises a plurality of graphic images of the respective physical location.

8. The method of claim 6, further comprising:
    displaying the physical location video data for the one or more others of the videoconference clients automatically when the one or more others of the videoconference clients join the videoconference.

9. An apparatus to perform the method of claim 6.

10. A computer-readable storage medium containing a computer program for performing the method of claim 6.

11. The method of claim 6, wherein displaying the physical location video data of each of the one or more others of the videoconference clients as a series of images shown at increasing magnification comprises displaying a view of the Earth, followed by a series of maps, followed by satellite photographs at a steady rate of increasing magnification.

12. A videoconferencing method comprising:

receiving audiovisual data from each of a plurality of videoconference clients;

sending the audiovisual data received from each of the videoconference clients to others of the videoconference clients;

automatically identifying a physical location of at least one of the videoconference clients;

obtaining physical location video data for each of the physical locations; and sending the physical location video data to one or more of the Videoconference clients; and presenting the physical location video data to the one or more of the videoconference clients as a series of images shown at increasing magnification.

13. The method of claim 12, wherein the physical location video data further comprises a plurality of graphic images of the respective physical location.

14. The method of claim 12, further comprising:

receiving an indicator of each physical location from respective ones of the videoconference clients.

15. The method of claim 12, further comprising:

sending the physical location video data for physical location of one of the videoconference clients automatically when the one of the videoconference clients joins the videoconference.

16. An apparatus to perform the method of claim 12.

17. A computer-readable storage medium containing a computer program for performing the method of claim 12.

18. The method of claim 12, wherein presenting the physical location video data to the one or more of the videoconference clients as a series of images shown at increasing magnification comprises presenting a view of the Earth, followed by a series of maps, followed by satellite photographs at a steady rate of increasing magnification.

* * * * *